No. 760,426. PATENTED MAY 24, 1904.
F. CONRAD.
ALTERNATING CURRENT WATTMETER.
APPLICATION FILED FEB. 20, 1903.
NO MODEL. 3 SHEETS—SHEET 1.

WITNESSES:
C. L. Belcher
J. E. Morse

INVENTOR
Frank Conrad
BY
Wesley G. Carr
ATTORNEY.

No. 760,426. PATENTED MAY 24, 1904.
F. CONRAD.
ALTERNATING CURRENT WATTMETER.
APPLICATION FILED FEB. 20, 1903.
NO MODEL. 3 SHEETS—SHEET 2.

WITNESSES:
C. L. Belcher
J. C. Morse

INVENTOR
Frank Conrad
BY
Keeley C. Carr
ATTORNEY.

No. 760,426. PATENTED MAY 24, 1904.
F. CONRAD.
ALTERNATING CURRENT WATTMETER.
APPLICATION FILED FEB. 20, 1903.
NO MODEL.
3 SHEETS—SHEET 3.

WITNESSES:
F. H. Miller.
Birney Hines

INVENTOR
Frank Conrad
BY
Wiley&Carr
ATTORNEY

No. 760,426.

Patented May 24, 1904.

UNITED STATES PATENT OFFICE.

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ALTERNATING-CURRENT WATTMETER.

SPECIFICATION forming part of Letters Patent No. 760,426, dated May 24, 1904.

Application filed February 20, 1903. Serial No. 144,355. (No model.)

*To all whom it may concern:*

Be it known that I, FRANK CONRAD, a citizen of the United States, residing at Edgewood Park, in the county of Allegheny and State of Pennsylvania, have invented a new and useful Improvement in Alternating-Current Wattmeters, of which the following is a specification.

My invention relates to instruments employed for measuring the energy of alternating-current circuits, and particularly to such instruments as register the amount of energy supplied to translating devices during the time in which the instruments are in service.

The object of my invention is to provide a simple, reliable, and readily-adjustable means for both securing quadrature relation between the shunt and series fields of the instrument and compensating for friction.

Figure 1:
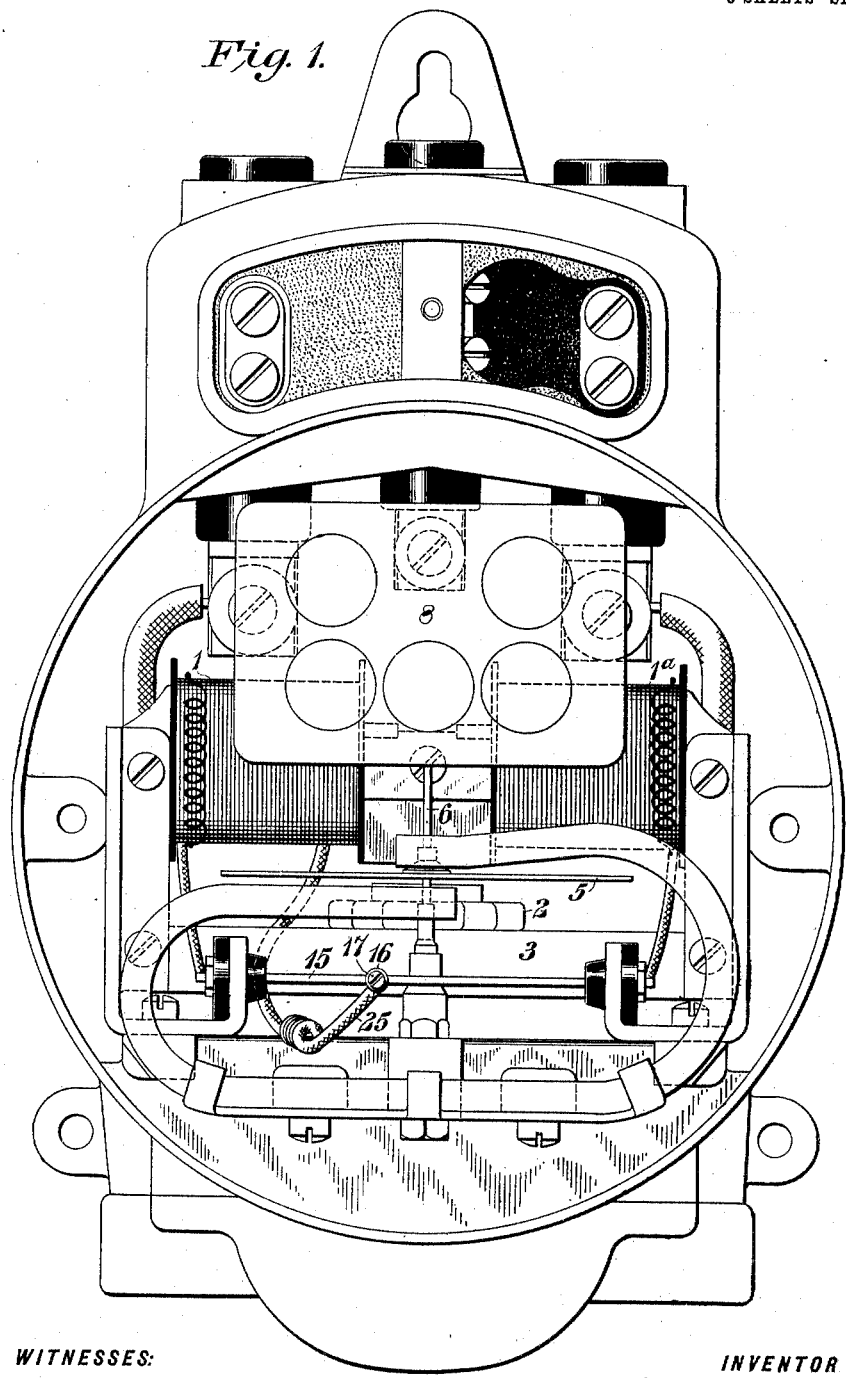
Figure 2:
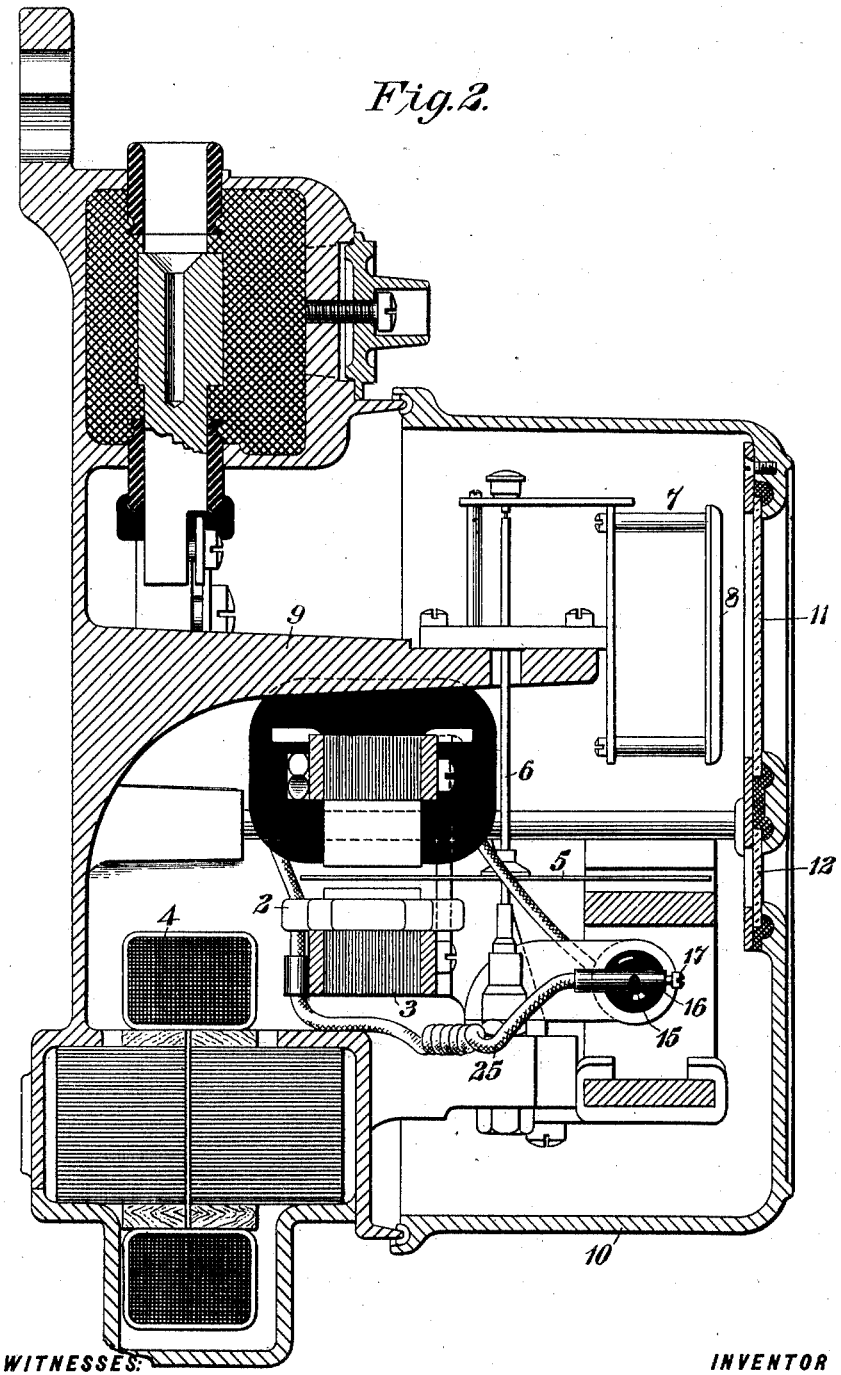
Figure 3:
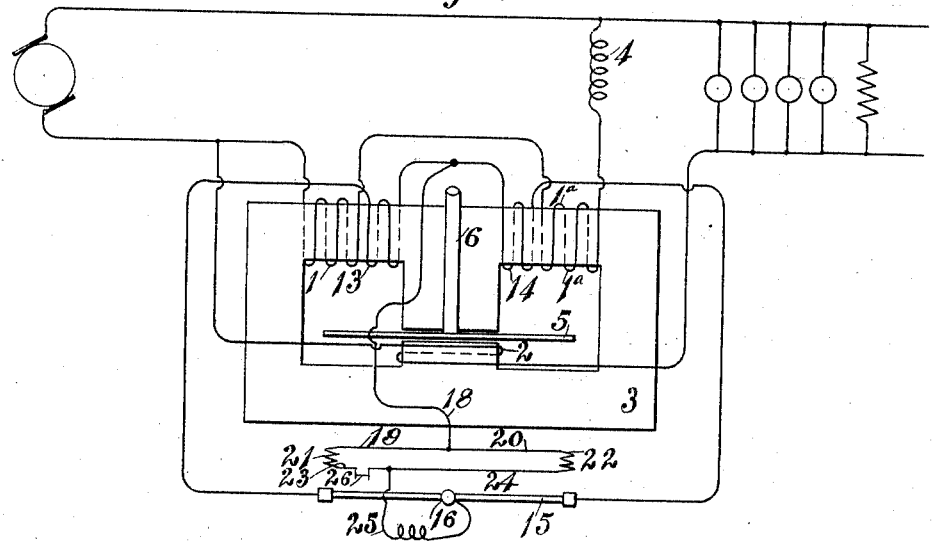
Figure 4:
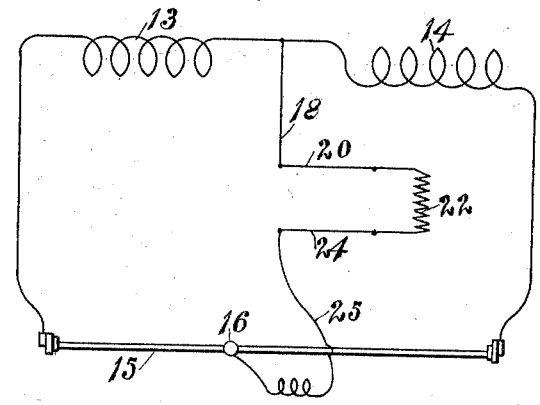

In the accompanying drawings, Figure 1 is a front elevation of a wattmeter provided with my improvement, the front portion of the casing being removed. Fig. 2 is a sectional view of the instrument at right angles to the view shown in Fig. 1. Fig. 3 is a diagram of the circuits and principal operating members of a wattmeter constructed in accordance with my invention, and Fig. 4 is a diagram of a modified form of my friction-compensating means.

The instrument shown in Figs. 1, 2, and 3 is, as regards its general form and its principal operating members, in all essential respects like the subject-matter of Patent No. 608,842, granted to the Westinghouse Electric & Manufacturing Company, as assignee of H. P. Davis and myself, on the 9th day of August, 1898.

The instrument shown, being designed for the measurement of the energy of single-phase circuits, comprises two shunt-connected coils 1 and 1ª, which are joined together in series to operate as a single coil, a series-connected coil 2, a laminated core 3 for said coils, an inductance-coil 4 for retarding the current in the shunt-circuit, a rotatable disk 5 constituting the secondary member or armature, a spindle 6 therefor, a gear-train-supporting frame 7, a dial-plate 8, (the gear-train for receiving and transmitting motion from the spindle 6 being omitted,) and a supporting-frame 9 for said parts. For the purpose of inclosing and protecting the operating parts of the instrument I also provide a casing-front 10, the face of which is provided with a sight-pane 11 to permit of examination of the registering devices, and a sight-pane 12 to permit of observing the movements of the disk 5.

In the patent above referred to means was provided for insuring exact quadrature relation between the magnetic flux due to the current traversing the series coil and that due to the current traversing the shunt-coils for a condition of no inductive load upon the external or work circuit, some such means being necessary in order to secure accurate registration of the energy of circuits having inductive loads. The means set forth in said patent consisted of two coils in inductive relation to the shunt-coils of the instrument and connected together in series through a resistance. The said patent also disclosed as a friction-compensating means a single closed coil in inductive relation to one of the shunt-coils of the instrument, and therefore unsymmetrically placed with reference to the armature. By means of my present invention I am able to utilize a single means for securing quadrature relation between the two magnetic fluxes of the instrument and also such compensation as may be necessary to eliminate the effect of that small degree of friction which is necessarily present where there are rotating parts.

As shown in Fig. 3, the quadrature-adjusting coils 13 and 14, which are disposed upon and in inductive relation to respective shunt-coils 1 and 1ª, have corresponding terminals connected to the respective ends of a resistance-wire 15, upon which is mounted an adjustable contact-piece 16, this piece being here shown as a short tube, in one end of which is mounted a set-screw 17 for fastening it in any position upon the wire 15 to which it may be moved. Any other suitable form of adjustable contact device may obviously be employed in lieu of that shown. The other ends of the coils 13 and 14 are connected together and are joined by means of conductors 18, 19, and 20 to corresponding terminals of two ohmic resistances 21 and 22, the other terminals of these resistances being connected by means of conductors 23, 24, and 25 to the adjustable contact device 16, the conductor 25 being of such length and flexibility as will permit of any desired degree of movement of the device 16 along the wire 15. This arrangement of apparatus is intended for circuits of relatively low frequency—such, for example, as seventy-two hundred alternations per minute. In the case of circuits of approximately double the above-mentioned frequency—as, for example, those having sixteen thousand alternations per minute—only one of the ohmic resistances need be employed, and I therefore provide a soldered connection 26, which may be unsoldered when the instrument is to be used in connection with the higher rate of alternations. When this connection 26 is broken, the circuits become, in effect, what is indicated in Fig. 4, the resistance 22 being the only one in service.

With the arrangement of apparatus shown it will be seen that the coils 13 and 14 are connected together in parallel, so that the current set up inductively in each coil must pass through either the resistance 21 or the resistance 22, or both, these resistances being so adjusted as to afford the proper quadrature relation between the shunt and series fields of the instrument.

When the contact device 16 is located at the middle point of the resistance-wire 15, equal currents will flow through the two coils 13 and 14, and there will consequently be no unbalancing effect produced upon the shunt-field. If, however, the contact device is moved toward one end of the wire, the resistance of the circuit of the coil toward which it is moved will be reduced and the resistance of the circuit of the other coil will be increased. It follows, therefore, that the relation of the currents flowing through the two coils will be changed and an unbalanced effect will be produced which will tend to drive the disk 5 in the one direction or the other, according to the direction of movement of the contact device. The contact device may therefore be set at such a position that the torque produced upon the disk by the unbalancing will exactly counterbalance the retarding effect due to friction without appreciably changing the total resistance of the compensating circuit, and therefore without appreciably affecting the quadrature relation of the shunt and series fields of the instrument.

While the specific devices shown and described have been designed for practical service and have been found satisfactory, it is conceivable that variations may be devised which will operate in substantially the same way to produce the same result, and I therefore desire it to be understood that all such variations are within the spirit and scope of my invention.

I claim as my invention—

1. An alternating-current wattmeter provided with two quadrature-adjusting coils that are substantially alike and symmetrically disposed and are connected together in parallel circuit.

2. An alternating-current wattmeter provided with two quadrature-adjusting coils connected together in parallel circuit and means for transferring resistance from the circuit of either of said coils to that of the other.

3. An alternating-current wattmeter provided with two quadrature-adjusting coils connected together in parallel circuit, a fixed resistance common to the circuits of said coils, a second resistance and means for transferring any desired portion of the latter from the circuit of either coil to that of the other.

4. An alternating-current wattmeter provided with two quadrature-adjusting coils having two of their terminals connected together, a resistance, to the ends of which the other terminals of the coils are connected, a contact device movable along said resistance and a non-adjustable resistance having its respective terminals connected to the movable contact device and to the connected ends of the coils.

5. An alternating-current wattmeter provided with two quadrature-adjusting coils having two corresponding ends connected together, a resistance-wire to the respective ends of which the other ends of the coils are connected, a contact device mounted upon said wire and movable longitudinally thereon and a non-adjustable resistance having its terminals connected respectively to the contact device and to the joined ends of the coils.

6. An alternating-current wattmeter provided with two quadrature-adjusting coils which have two corresponding ends connected together, a resistance member to the respective terminals of which the other ends of the coils are connected, an adjustable contact device making engagement with said resistance member and two non-adjustable resistances one or both of which may be connected between the contact device and the joined ends of the coils.

7. An alternating-current wattmeter having shunt and series field-coils, two like quadrature-adjusting coils symmetrically disposed in inductive relation to the shunt field-coils and connected together in parallel circuit and a resistance member any portion of which may be transferred from the circuit of either coil to that of the other.

8. An alternating-current wattmeter having shunt and series field-coils, two like quadrature-adjusting coils symmetrically disposed in inductive relation to the shunt field-coils and connected together in parallel circuit.

In testimony whereof I have hereunto subscribed my name this 13th day of February, 1903.

FRANK CONRAD.

Witnesses:
  A. B. REYNDERS,
  JAMES B. YOUNG.